United States Patent [19]

Ogisu et al.

[11] 4,396,596

[45] Aug. 2, 1983

[54] METHOD OF PREPARING GAMMA FERRIC HYDROXYOXIDE POWDER

[75] Inventors: Kenji Ogisu; Makoto Inoue; Kenji Yazawa; Haruko Masuya, all of Yokohama, Japan

[73] Assignee: Sony Corporation, Tokyo, Japan

[21] Appl. No.: 312,797

[22] Filed: Oct. 19, 1981

[30] Foreign Application Priority Data

Oct. 24, 1980 [JP] Japan .................................. 55-149801

[51] Int. Cl.$^3$ .............................................. C01G 49/06
[52] U.S. Cl. .................................. 423/634; 252/62.56; 423/632; 423/633
[58] Field of Search ...................... 423/632, 633, 634; 252/62.56

[56] References Cited

U.S. PATENT DOCUMENTS 3,082,067  3/1963  Hund .................................. 423/634

FOREIGN PATENT DOCUMENTS 923038  4/1963  United Kingdom ............... 423/634

Primary Examiner—Jack Cooper
Attorney, Agent, or Firm—Hill, Van Santen, Steadman, Chiara & Simpson

[57] ABSTRACT

A method of preparing gamma ferric hydroxyoxide in which ferrous ions are reacted in an alkaline solution to produce a suspension of ferric hydroxide, the resulting suspension is treated with an oxidizing gas in a first oxidizing step at a relatively high oxidation rate, sufficient to cause nucleation of gamma ferric hydroxyoxide to occur, and then the oxidation rate is reduced in a second oxidizing step to cause crystal growth to occur on the nuclei formed in the first oxidizing step. The resulting product has magnetic and physical characteristics making it extremely suitable for use in the manufacture of magnetic recording media.

5 Claims, 8 Drawing Figures

METHOD OF PREPARING GAMMA FERRIC HYDROXYOXIDE POWDER

BACKGROUND OF THE INVENTION

1. Field of the Invention

The present invention relates to a method for producing gamma ferric hydroxyoxide by means of at least two oxidation steps differing in intensity, to produce a raw material for magnetic powders used to make magnetic recording media.

2. Description of the Prior Art

When a magnetic powder such as gamma ferric oxide is prepared, there can be numerous starting materials including acicular alpha ferric hydroxyoxide (geothite) or acicular gamma ferric hydroxyoxide (lepidocrocite). These materials are dehydrated, reduced and then oxidized to form the desired gamma ferric oxide. In this particular case, the gamma form has an advantage compared with the alpha form in that it has superior dispersion characteristics because it produces crystals with no branches and it can produce a magnetic powder having a high residual magnetic flux density. However, the use of gamma ferric hydroxyoxide as a starting material requires severe conditions of formation as compared with the alpha form so that a method of manufacturing magnetic powders utilizing the gamma form as the starting material is not widely employed.

The lepidocrocite is produced by generating ferrous hydroxide by the reaction of an alkali metal hydroxide such as sodium hydroxide with a ferrous salt such as ferrous chloride in aqueous alkaline solution by passing an oxidizing gas into the aqueous alkaline solution. It is known that the gamma ferric hydroxyoxide is produced through an intermediate product which is generated by the process known as green rust.

Upon the production of seed crystals, the usual technique would be to grow crystals from such seeds to a desired size. Consequently, it is preferable that the seed crystal be as small as possible so that the ultimate crystal size can be small. However, when lepidocrocite is formed, it is not usually possible to provide a suitably small sized seed crystal if high speed oxidation is carried out, as the crystal under these conditions becomes vein-like in shape and appearance and is not entirely suitable for transformation into ferric oxide usable in magnetic recording media.

SUMMARY OF THE INVENTION

The present invention is directed to a method for preparing gamma lepidocrocite suitable for making a magnetic powder having improved magnetic characteristics. The improved material produced according to the present invention has an improved crystalline shape.

In general, the method of the present invention makes use of a suspension of ferrous hydroxide obtained by the reaction of ferrous ions and alkali in an aqueous solution. This suspension is subjected to relatively high rate oxidation by passing an oxygen containing gas into the solution. The oxidation is carried out at a speed sufficient to cause nuclei of gamma ferric hydroxyoxide to be produced. The end point of the first part of the reaction can be determined by the ratio of ferric ions to total amount of iron in solution, and when this reaches a value in the range from 0.3 to 0.48, preferably 0.35 to 0.47, the initial oxidation at a relatively rapid rate is terminated and a slower oxidation is commenced, at an oxidizing rate of 1/5 to 1/50 of the original oxidation rate. In the second stage, at which the oxidation rate is insufficient to increase the amount of new nuclei formed significantly, the previously formed nuclei are grown into crystals of a desirable shape very suitable for transformation into gamma ferric oxide for magnetic recording purposes.

BRIEF DESCRIPTION OF THE DRAWINGS

Other features and advantages of the present invention will be apparent from the following description taken in conjunction with the accompanying drawings in which.

DESCRIPTION OF THE PREFERRED EMBODIMENTS

As mentioned previously, upon synthesizing lepidocrocite, it is well known that this material is generated through an intermediate product which is known as green rust and is produced in the oxidizing process by passing an oxidizing gas into a solution containing the hydroxide. The present inventors discovered that when the above-mentioned hydroxide was oxidized, with high speed oxidizing gas injection, at a certain oxidizing state, the crystals of green rust coexisted with the fine or microcrystals of lepidocrocite, and the microcrystals of lepidocrocite consisted of particles of relatively uniform particle size, with a finely defined rectangular shape. It was discovered, however, that if the high rate oxidation is continued beyond this point, the shape of the lepidocrocite was significantly changed to be vein-like.

The present invention is based upon a method by which lepidocrocite of improved shape can be obtained, and accordingly magnetic powders having superior magnetic characteristics, particularly residual flux density, and squareness ratio, can be manufactured by using the improved lepidocrocite as a starting material.

In accordance with the present invention, the oxidizing process is conducted in at least two stages, in the first of which an oxygen-containing gas is used under relatively high oxidation rates, and in the second stage, a relatively low rate oxidizing process is carried out. This high rate and low rate oxidation processes can be adjusted by changing the amount of oxygen in the oxygen-containing gas, changing the agitating speed, or the like. In accordance with the present invention, the high rate oxidation has a reaction velocity sufficient to generate nuclei of lepidocrocite while the low speed oxidation does not generate any significant amounts of new nuclei, but provides conditions more conducive to proper crystal growth on the existing nuclei.

In the first stage of oxidation, a condition is achieved such that the fine crystals of green rust coexist with the fine crystals of lepidocrocite. The progress of the reaction is monitored by determining the amount of ferric ion present as the reaction progresses, and the oxidation process is switched from the high rate to the low rate process when the ratio of ferric ions to total iron dissolved in the solution reaches a predetermined value.

The high speed oxidation is maintained until the ratio of hydroxyl ions to ferrous ions is smaller than 1 and the ratio of ferric ions to total iron is in the range of 0.3 to 0.48, preferably 0.35 to 0.47. When this condition is achieved, the second stage of low rate oxidation begins, using an oxidation rate corresponding to about 1/5 to 1/50 of the high rate of the first stage. In the second stage, the fine crystals of green rust and the fine nuclei of gamma lepidocrocite are grown into larger crystals of the desired product. These crystals exhibit a central rectangular shape and do not evidence any significant vein shape.

When seed crystals of the gamma lepidocrocite thus prepared are treated with green rust provided from a separate source and containing no nuclei of gamma lepidocrocite, and the mixture is subjected to a third stage of low rate oxidizing process under the same conditions as in the second stage, crystals of the desired gamma ferric hydroxyoxide can be readily grown under easily controlled conditions.

Figure 1:
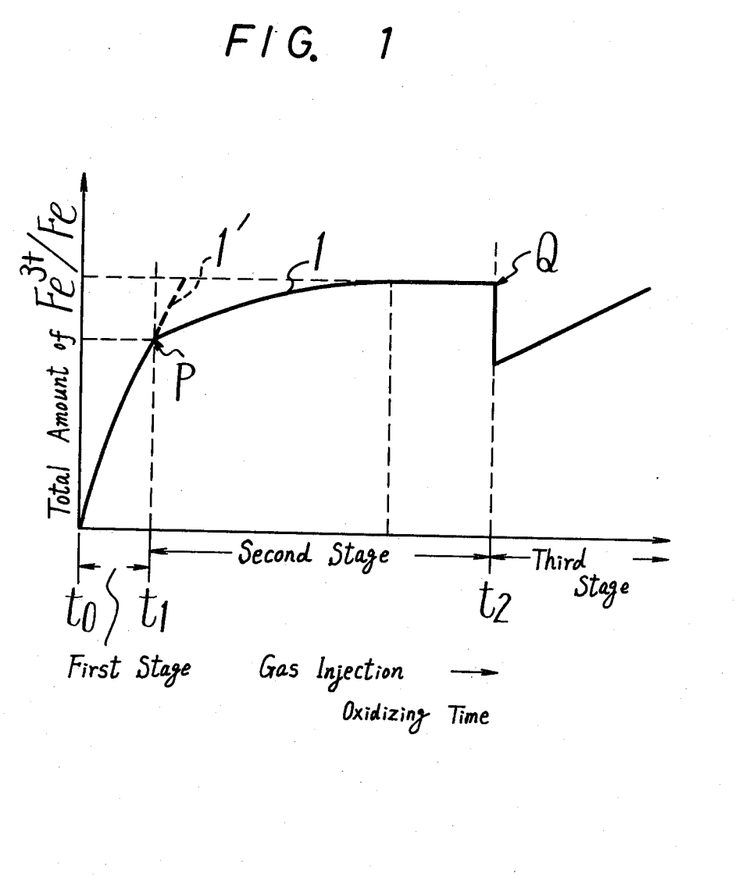
FIG. 1 is a graph plotting ratio of ferric ions to total iron in the suspension being oxidized, against time of oxidation.

Turning to the drawings, in FIG. 1, a solid line curve 1 represents the programming of gas injection oxidation according to the method of the invention. From the starting time, $t_0$, the high rate oxidation is carried out until a time $t_1$ when the suspension has a ratio of ferric ions to total iron represented by the point P. At this stage, the low rate oxidation is initiated as indicated by the change in slope of the curve. As mentioned, the point P occurs when the ratio is in the range from 0.3 to 0.48 and preferably from 0.35 to 0.47. The desired seed crystals are obtained at the second stage of low rate oxidation or green rust which has been prepared separately is added to the solution at a time $t_2$ when the ratio of ferric ions to iron is at a value Q. Then a third stage oxidation commences, at a rate substantially that used between the time intervals $t_1$ and $t_2$.

The broken line curve 1' in FIG. 1 represents the progress of the reaction in the normal prior art method where a relatively slow rate second oxidation step is not employed.

The following specific examples of the invention have been added for purposes of clarity.

EXAMPLE 1

A homogeneous mixer with a volume of 10 l was charged with 973.7 g of $FeCl_2.4H_2O$, 196 g of NaOH and 7 l of deionized water. The mixture was stirred such that the rotational velocity of the blade of the mixer was about 10,000 rpm. Thereafter, a mixture of about 50% oxygen and 50% nitrogen was fed into the mixer at a rate of about 25 l/min. to carry out a high rate oxidation in 5 minutes and 25 seconds at an initial temperature of 30° C. This gas mixture was changed to 100% nitrogen to stop the oxidation. At this time, the ratio of ferric ions to iron in solution was 0.47. The mixture or suspension was then transferred to a circular type ventilating agitator and a mixed gas containing 10% oxygen and 90% nitrogen was supplied thereto at the rate of 15 l/min. These low rate oxidation conditions were continued at a temperature of 30° C. while the propeller of the agitator was rotated at a rotational speed of 1050 rpm. The precipitate thus obtained was substantially only gamma ferric hydroxyoxide, and this was confirmed by an X-ray diffraction test.

Figure 2:
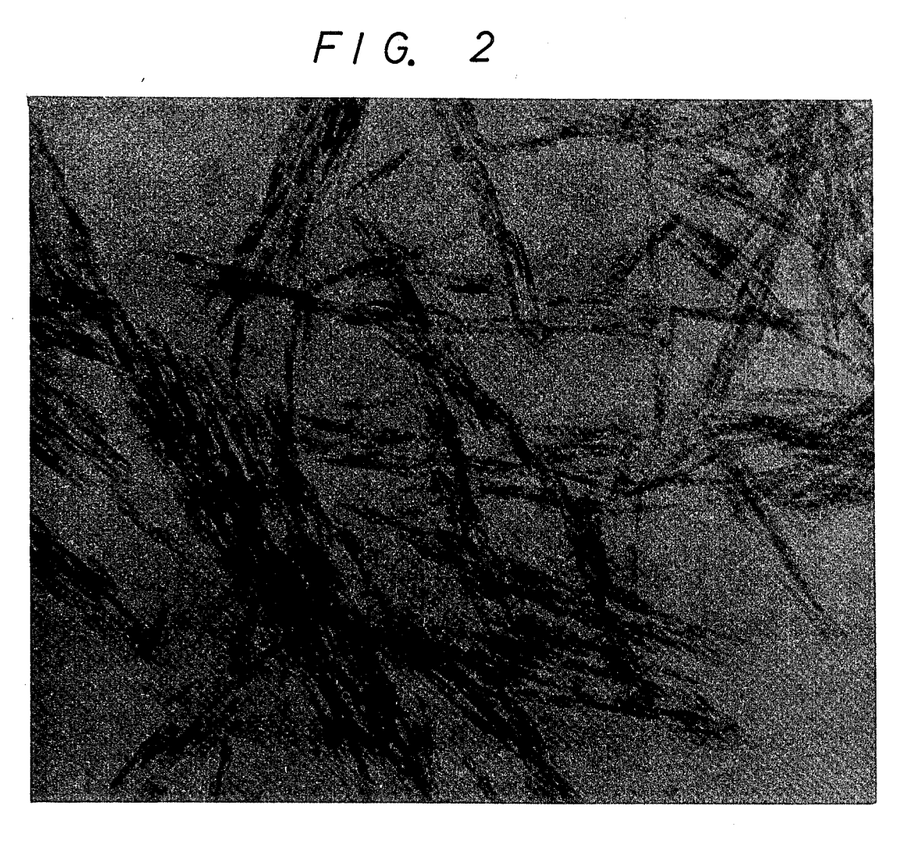
FIGS. 2 to 4 are reproductions of photomicrographs of crystalline particles produced according to the method of the present invention.

FIG. 2 is a reproduction of a photomicrograph of the gamma ferric hydroxyoxide at a magnification of 30,000 times from which it is apparent that the crystals obtained are uniform in a somewhat rectangular shape, and very pleasing in appearance.

EXAMPLE 2

To a homogeneous mixer having a volume of 10 l there was added 973.7 g of $FeCl_2.4H_2O$, 196 g of NaOH and 7 l of water. The mixture was stirred under conditions such that the rotational speed of the blade of the mixer was 10,000 rpm. Thereafter, a mixed gas containing 50% oxygen and 50% nitrogen was fed at a rate of 25 l/min. to carry out a high rate oxidation at 30° C. After 3 minutes, the gas was changed to a gas consisting of 100% nitrogen to stop the oxidation. At this time, the value of ferric ion to iron in the solution was 0.336. The mixture or suspension was transferred to a circular type ventilating agitator and a mixed gas containing 10% oxygen and 90% nitrogen was supplied thereto at a rate of 15 l/min. The low rate oxidation was carried out at a temperature of 30° C. while the propeller of the agitator was rotated at a speed of 1050 rpm.

Figure 3:
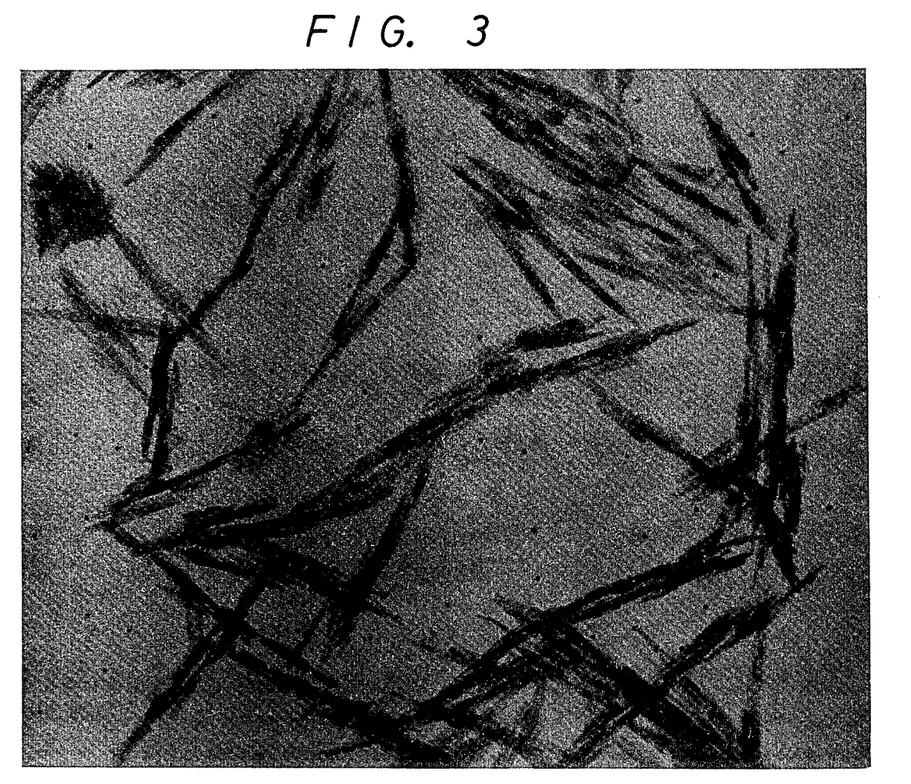

FIG. 3 is a reproduction of a photomicrograph of the particles thus produced, with a magnification of 30,000 times.

EXAMPLE 3

Figure 4:
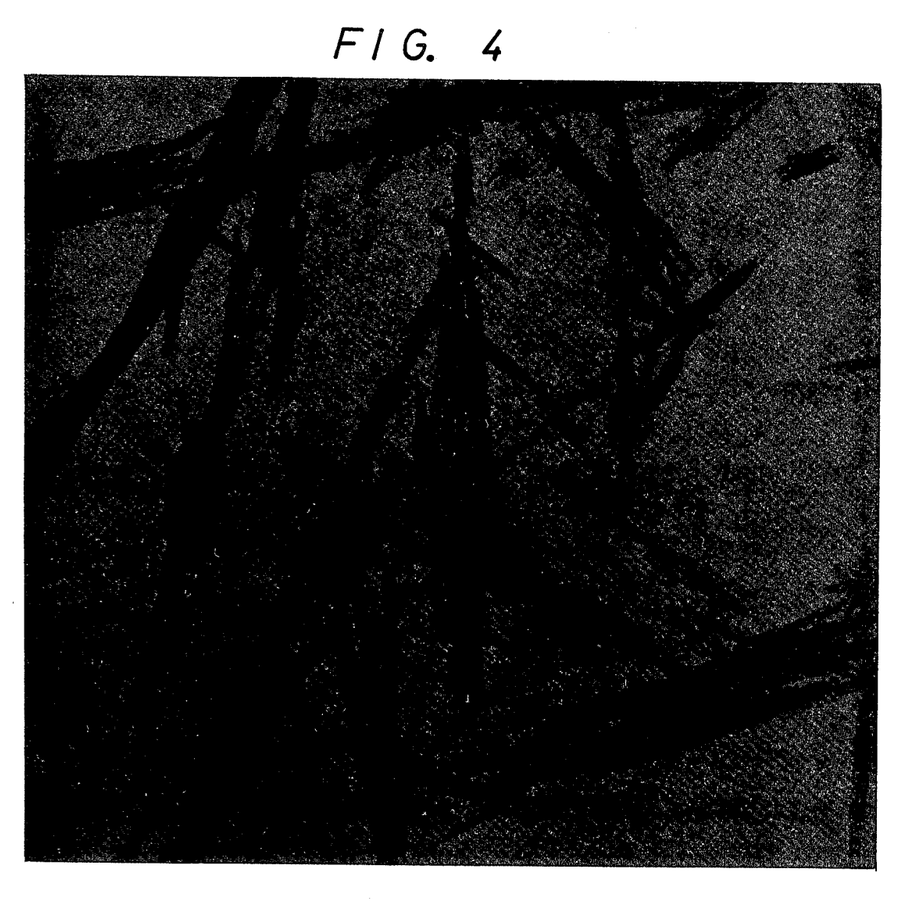

The suspension of gamma ferric hydroxyoxide produced by Example 1 was put in an atmosphere of 100% nitrogen gas and removed from the treating vessel. Thereafter, 2 l of a solution containing green rust which had been made separately was poured therein and the mixture was stirred. The green rust containing solution was prepared by lightly oxidizing the suspension obtained in Example 1. Oxidation conditions consisted of passing a mixed gas containing 50% oxygen and 50% nitrogen at a rate of 25 l/min. to the solution at 30° C. for 1 minute after which the gas was changed to 100% nitrogen. Thus, a solution containing green rust but being free of gamma ferric hydroxyoxide crystals was obtained. The ratio of ferric ions to iron in the mixture was 35.5%. Thereafter, a mixed gas containing 10% oxygen and 90% nitrogen was supplied to the suspension at the rate of 15 l/min. and a reaction was carried out for 2 hours at a temperature of 30° C. while the propeller was rotated at a speed of 1050 rpm. The crystal obtained in this way was similar to that produced by Example 1, but with a much larger crystal size. FIG. 4 is a reproduction of a photomicrograph of this crystal at a magnification of 30,000 times.

The materials produced according to the present invention were compared with those produced by other types of processes as explained in the following examples.

COMPARATIVE EXAMPLE 1

Figure 5:
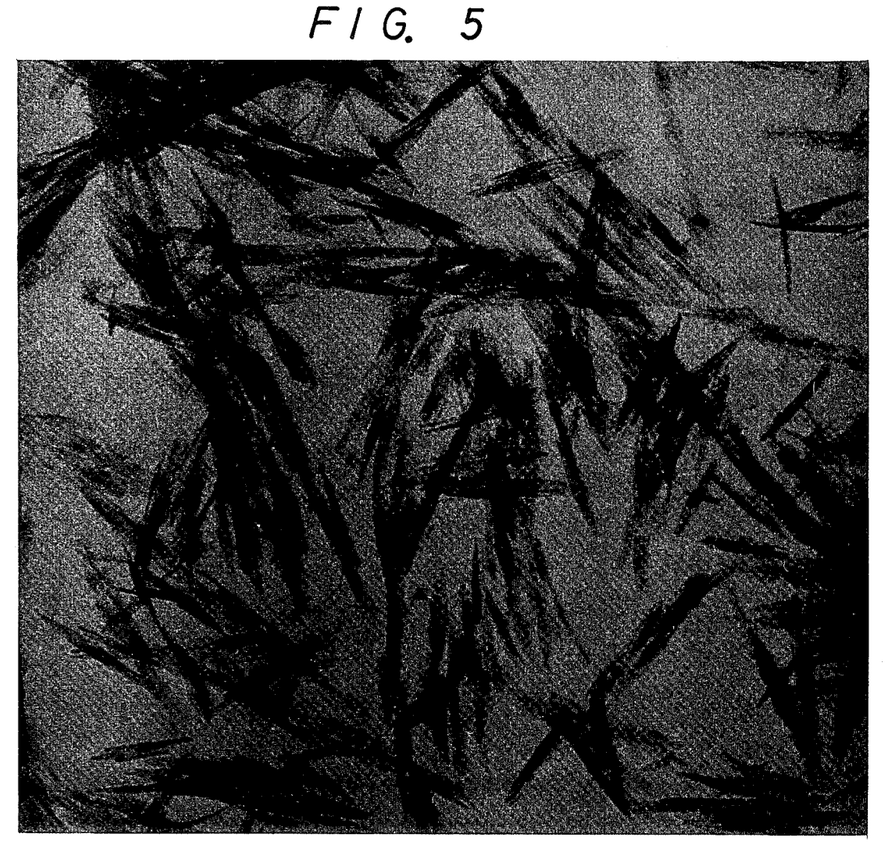
FIGS. 5 to 8 are reproductions of photomicrographs of crystalline particles produced by methods to which the method of the present invention has been compared.

A mixer was charged with 79.52 g of $FeCl_2.4H_2O$ and 16.0 g of NaOH dissolved in 800 ml of deionized water. This mixture was subjected to an oxidizing reaction by supplying air at the rate of 7 l/min. to the mixer at 25° C. The precipitate produced at this time was crystals of gamma ferric hydroxyoxide having a veined appearance. The nature of the crystal was determined by an X-ray diffraction test. FIG. 5 is a reproduction of a photomicrograph of this crystal at a magnification of 30,000 times.

COMPARATIVE EXAMPLE 2

Figure 6:
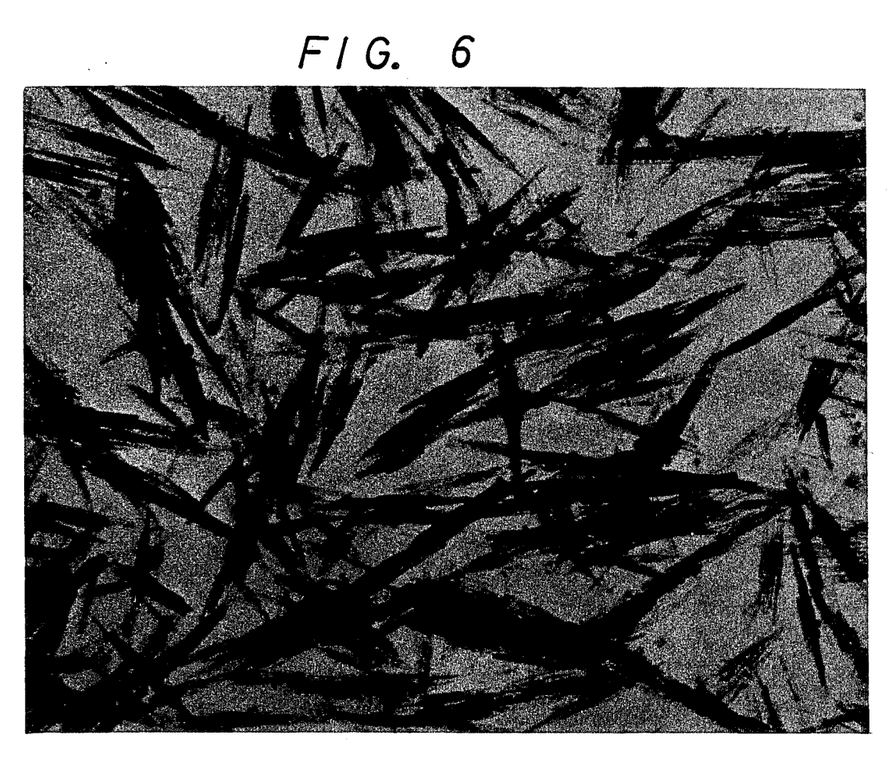

A suspension was made up from 311.84 g of green rust prepared separately in 500 ml of a dispersion liquid containing 0.18053 g/20 ml of gamma ferric hydroxyoxide crystals made by Comparative Example 1. The mixture or suspension was agitated under nitrogen gas and thereafter a mixed gas containing 2.5% oxygen and 97.5% nitrogen was supplied at a rate of 5 l/min. at 30° C. in a separable flask. The rotational speed of the propeller was 352 rpm. The precipitate thus obtained was 100% gamma ferric hydroxyoxide. FIG. 6 is a reproduction of a photomicrograph of the crystal particles obtained at a magnification of 30,000 times.

The gamma ferric hydroxyoxide of Examples 1, 2 and 3, as well as Comparative Examples 1 and 2, were subjected to oxidation to form gamma $Fe_2O_3$ magnetic powders and were given the specimen numbers 1 to 5, respectively.

The magnetic characteristics consisting of the coercive force Hc, the magnetizing amount $\sigma_S$ and the squareness ratio $R_S$ of the above magnetic powders were determined and set forth in Table 1.

TABLE 1

| Specimen No. | Hc (Oe) | $\sigma_S$ (emu/g) | $R_S$ |
|---|---|---|---|
| 1 | 330 | 70.1 | 0.42 |
| 2 | 362 | 70.5 | 0.51 |
| 3 | 392 | 73.5 | 0.48 |
| 4 | 144 | 57.4 | 0.344 |
| 5 | 240 | 62.3 | 0.46 |

As evident from the above Table, the magnetic powders provided by the examples of the present invention using two oxidation stages are much improved in magnetic characteristics as compared with those prepared by only high-rate gas injection oxidation as in the Comparative Examples.

Furthermore, the magnetic powder made by using the improved lepidocrocite of the present invention as its raw material was used to form a magnetic layer for a magnetic record medium. The procedure is explained in the following Example.

EXAMPLE 4

A magnetic paint having the following composition was prepared:

400 parts by weight of gamma $Fe_2O_3$ (specimen 3) were combined with 100 parts by weight of a polyvinylchloride-polyvinylacetate-polyvinylalcohol copolymer (VAGH) together with 12 parts of a lecithin dispersion agent, and 1250 parts by weight of a solvent consisting of methylethylketone and cyclohexanone in a ratio of 1:1.

The magnetic paint produced was coated on a film made of polyethylene terephthalate to produce a magnetic record medium. The coercive force, residual magnetic flux density, and squareness ratio of the magnetic record medium were measured and the results are shown in Table 2. For comparison, a magnetic record medium was also made up using as a starting material the gamma ferric hydroxyoxide produced by Comparative Example 2.

TABLE 2

| | Hc (Oe) | Br (Gauss) | $R_S$ |
|---|---|---|---|
| Example 4 | 370 | 1310 | 0.88 |
| Comparative Example 2 | 230 | 1050 | 0.77 |

From the foregoing Table, it will be apparent that the magnetic record medium employing magnetic materials produced according to the present invention has superior magnetic characteristics.

The present invention can be applied to raw materials used to provide the so-called alloy magnetic powder. An example of this preparation is given in Example 5.

EXAMPLE 5

The gamma ferric hydroxyoxide produced by Example 1 was dispersed into 1.5 l of water in 3 hours, and cobalt chloride and aqueous chromium sulfate solutions were added to the suspension in such an amount that the atomic ratio of cobalt to the sum of iron and cobalt was 15 atomic % while the atomic ratio of chromium to the sum of iron and cobalt was 0.5 atomic %. The suspension was further dispersed by an agitator for 1 hour. Thereafter, 15.4 moles/l of ammonia water was added to the suspension and dispersed for 1 hour to deposit hydroxides of cobalt and chromium on the surface of the gamma ferric hydroxyoxide. After the completion of the absorption reaction, the particles were rinsed by water, dried by separate furnaces, dehydrated, and subjected to annealing to remove pores by 2 hours of thermal treatment at 700° C. The materials were then deoxidized in air to alpha ferric oxide and reduced in hydrogen at 450° C. for 3 hours to provide alloy magnetic powders. These magnetic powders were immersed in toluene, removed therefrom, and dried at room temperature. The magnetic powders thus produced had a coercive force of 1260 Oe, the magnetizing amount was 166 $emu$/g, the squareness ratio was 50%, and the ratio of surface area of 57.8 $m^2$/g.

As described previously, the first stage of high rate oxidation is continued until the ratio of ferric ions to iron in solution becomes 0.3 to 0.48. When the ratio was less than 0.3, the crystals obtained after the second stage oxidation became too large and had poor shape or appearance. When the value exceeded 0.48, the crystal was deteriorated in shape.

Figure 7:
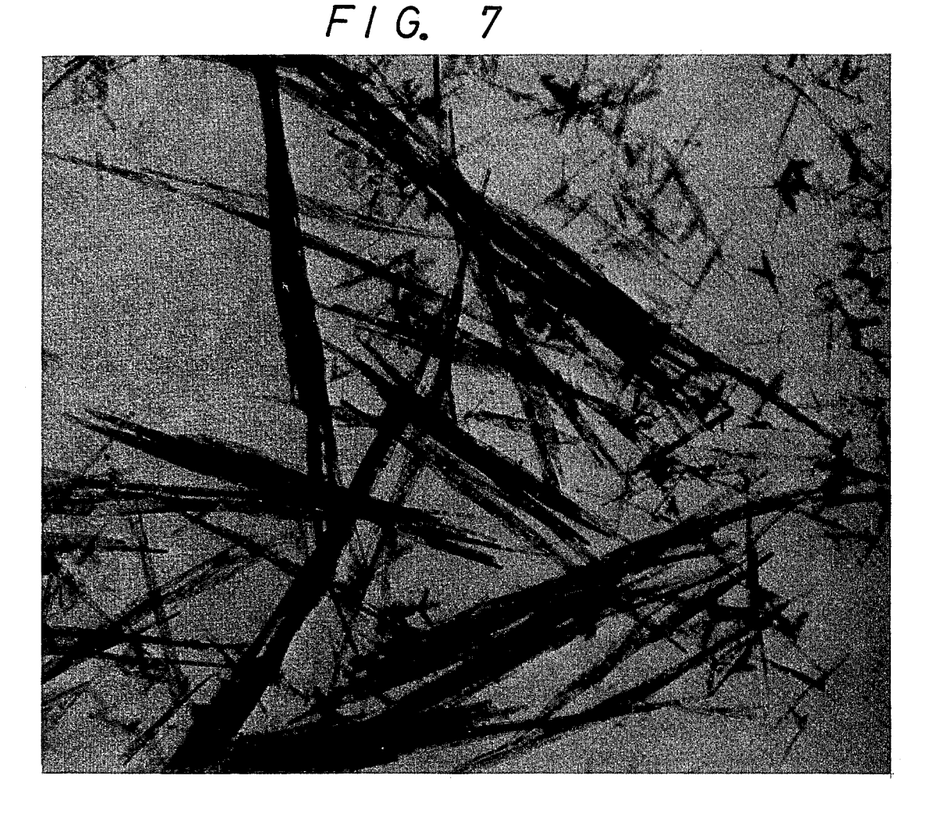
Figure 8:
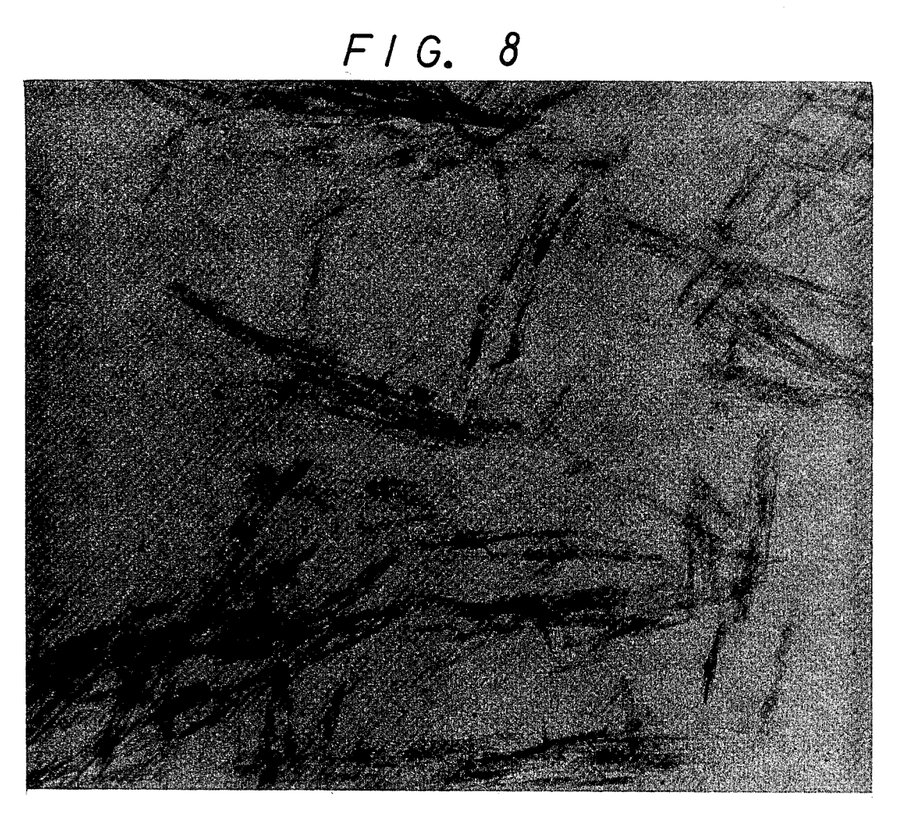

FIGS. 7 and 8 are reproductions of photomicrographs of crystal particles at magnifications of 30,000 times where the ratio is less than 0.3 and larger than 0.48, respectively. It will be evident from these showings that the shapes of the crystals have been deteriorated.

As described, the present invention provides improved lepidocrocites of rectangular shape without veins and branches. When magnetic powder and magnetic paint are made using the improved materials, there are superior dispersion properties. The magnetic characteristics are also substantially improved.

The above description relates to preferred embodiments of the invention, but it will be apparent that many modifications and variations can be effected by one skilled in the art without departing from the spirit or scope of the novel concepts of the invention.

We claim as our invention:
1. A method of preparing gamma ferric hydroxyoxide which consists essentially of:
   reacting ferrous ions in an alkaline solution to produce a suspension of ferrous hydroxide,
   passing an oxidizing gas into said suspension in a first oxidizing step to an extent sufficient to cause nucleation of gamma ferric hydroxyoxide to occur, and until the ratio of ferric ions to the total amount of iron in solution is in the range from 0.3 to 0.48, and the ratio of hydroxyl ions to ferrous ions is less than one and reducing the oxidation rate of said gas after such nucleation occurs and said ratios are effected to a value of 1/5 to 1/50 of the rate in said first oxidizing step in a second oxidizing step to cause crystal growth to occur on the nuclei formed in said first oxidizing step without significantly increasing the amount of new nuclei formed, with the resultant crystals exhibiting a central rectangular shape without any significant vein shape.

2. A method according to claim 1 in which:
said first oxidizing step is continued until the ratio of ferric ions to the total amount of iron in solution is in the range from 0.35 to 0.47.

3. A method according to claim 1 which includes the steps of:
adding a solution containing green rust to the crystals growing in said second oxidizing step and
continuing the oxidation at the reduced oxidation rate.

4. A method according to claim 1 which includes the step of:
reducing said rate of oxidation by decreasing the proportion of oxygen in the oxygen-containing gas.

5. A method according to claim 1 which includes the steps of:
reducing said rate of oxidation both by decreasing the proportion of oxygen in the oxygen-containing gas and also decreasing the flow rate of said oxygen-containing gas into said suspension.

* * * * *